US009625795B2

(12) United States Patent
Egawa

(10) Patent No.: US 9,625,795 B2
(45) Date of Patent: Apr. 18, 2017

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 152 days.

(21) Appl. No.: 14/744,699

(22) Filed: Jun. 19, 2015

(65) Prior Publication Data

US 2015/0381953 A1 Dec. 31, 2015

(30) Foreign Application Priority Data

Jun. 25, 2014 (JP) .................................. 2014-130549

(51) Int. Cl.
*G03B 21/14* (2006.01)
*H04N 9/31* (2006.01)
*G02B 26/00* (2006.01)

(52) U.S. Cl.
CPC ......... *G03B 21/142* (2013.01); *G02B 26/008* (2013.01); *H04N 9/3111* (2013.01); *H04N 9/3144* (2013.01); *H04N 9/3158* (2013.01)

(58) Field of Classification Search
CPC .. G02B 26/008; H04N 9/3111; H04N 9/3144; H04N 9/3158; G03B 21/142
See application file for complete search history.

(56) References Cited

U.S. PATENT DOCUMENTS

| 8,354,790 | B2 | 1/2013 | Iwanaga | |
|---|---|---|---|---|
| 8,820,940 | B2 | 9/2014 | Kita | |
| 2009/0284148 | A1* | 11/2009 | Iwanaga | ............... G02B 26/008 313/506 |

FOREIGN PATENT DOCUMENTS

| JP | 2009-277516 A | 11/2009 |
|---|---|---|
| JP | 2012-004009 A | 1/2012 |
| JP | 2012-123179 A | 6/2012 |

* cited by examiner

*Primary Examiner* — Sultan Chowdhury
*Assistant Examiner* — Magda Cruz
(74) *Attorney, Agent, or Firm* — Oliff PLC

(57) ABSTRACT

A wavelength conversion element includes a disk, a wavelength conversion layer disposed above a first surface of the disk, and a reflecting layer disposed between the disk and the wavelength conversion layer, and Formula 1 is fulfilled.

$-d\rho w(r0)/dr < d\rho s(r0)/dr$ (Formula 1)

where, assuming that a circular polar coordinate system having the rotational center as an origin is set on a plane parallel to the first surface of the disk, r: moving radius in the circular polar coordinate system,
r0: radius of the disk,
ρs(r): thermal resistance of thermal paths passing through inside and a surface of the disk between a point with the moving radius r on the first surface of the disk and an entire surface of the disk, and
ρw(r): thermal resistance of the wavelength conversion layer in a thickness direction of the wavelength conversion layer at the moving radius r.

10 Claims, 6 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

As described in, for example, JP-A-2009-277516, there has been proposed a light source device having a configuration in which a layer of phosphor for emitting light in response to reception of excitation light is disposed on a transparent member having a circular shape, and the transparent member is rotated by an electric motor.

In such a light source device as described above, if the excitation light is intensified, the amount of heat generation in the phosphor, namely a wavelength conversion layer, increases, and thus the temperature of the phosphor rises. If the temperature of the phosphor becomes high, there has been a possibility of causing degradation of the conversion efficiency of the phosphor and breakage of the phosphor.

SUMMARY

An advantage of some aspects of the invention is to provide a wavelength conversion element capable of inhibiting the wavelength conversion layer from rising in temperature to a high temperature level, a light source device provided with such a wavelength conversion element, and a projector provided with such a light source device.

One aspect of a wavelength conversion element according to the invention includes a disk having a first surface, and rotatable around a rotational center, a wavelength conversion layer disposed above the first surface of the disk, and having a predetermined thickness, and a reflecting layer disposed between the disk and the wavelength conversion layer, and adapted to reflect a light beam generated by the wavelength conversion layer, and Formula 1 is fulfilled.

$$-d\rho w(r0)/dr < d\rho s(r0)/dr \qquad \text{Formula 1}$$

where assuming that a circular polar coordinate system having the rotational center as an origin is set on a plane parallel to the first surface of the disk, r: moving radius in the circular polar coordinate system, r0: radius of the disk, ρs (r): thermal resistance of thermal paths passing through inside and a surface of the disk between a point with the moving radius r on the first surface of the disk and an entire surface of the disk, and ρw(r): thermal resistance of the wavelength conversion layer in the thickness direction of the wavelength conversion layer at the moving radius r.

According to the aspect of the wavelength conversion element according to the invention, by fulfilling Formula 1, the thermal resistance of the wavelength conversion element takes the minimum value at a position inside of the outer circumference of the disk. Therefore, it is easy to irradiate the place, at which the thermal resistance takes the minimum value, with the excitation light beam, and the heat of the wavelength conversion layer can efficiently be released. Therefore, according to the aspect of the wavelength conversion element according to the invention, it is possible to inhibit the wavelength conversion layer from rising in temperature to a high temperature level.

The aspect of the wavelength conversion element according to the invention may be configured such that the wavelength conversion layer is disposed so as to include an area included in a range in which the moving radius is larger than r1 and smaller than r0, and r1 fulfills Formula 2.

$$\rho s(r1)+\rho w(r1)=\rho s(r0)+\rho w(r0) \qquad \text{Formula 2}$$

According to this configuration, by irradiating the area in the wavelength conversion layer, which is included in the range in which the moving radius is larger than r1 and smaller than r0, with the excitation light beam, the heat of the wavelength conversion layer can efficiently be released.

The aspect of the wavelength conversion element according to the invention may be configured such that the wavelength conversion layer is disposed only in a range in which the moving radius is larger than r1 and smaller than r0.

According to this configuration, in either of the cases in which the respective positions of the wavelength conversion layer are irradiated with the excitation light beam, the heat of the wavelength conversion layer can efficiently be released.

The aspect of the wavelength conversion element according to the invention may be configured such that the wavelength conversion layer is disposed so as to include a position at which the moving radius is r2, and r2 fulfills Formula 3.

$$-d\rho w(r2)/dr = d\rho s(r2)/dr \qquad \text{Formula 3}$$

According to this configuration, by irradiating the position in the wavelength conversion layer at which the moving radius is r2 with the excitation light beam, the heat of the wavelength conversion layer can efficiently be released.

One aspect of a light source device according to the invention includes the wavelength conversion element described above, a light source adapted to emit an excitation light beam, and a rotation mechanism adapted to rotate the disk centered on the rotational center, and the excitation light beam enters the wavelength conversion layer from an opposite side to the reflecting layer.

According to the aspect of the light source device according to the invention, since any one of the wavelength conversion elements described above is provided, it is possible to inhibit the wavelength conversion layer from rising in temperature to a high temperature level.

The aspect of the light source device according to the invention may be configured such that the wavelength conversion layer is disposed so as to include an area included in a range in which the moving radius is larger than r1 and smaller than r0, an area of the wavelength conversion layer irradiated with the excitation light beam includes the area included in a range in which the moving radius is larger than r1 and smaller than r0, and r1 fulfills Formula 2.

$$\rho s(r1)+\rho w(r1)=\rho s(r0)+\rho w(r0) \qquad \text{Formula 2}$$

According to this configuration, the heat of the wavelength conversion layer can efficiently be released.

The aspect of the light source device according to the invention may be configured such that the wavelength conversion layer is disposed so as to include a position at which the moving radius is r2, the moving radius of a center in the moving radius direction of an area of the wavelength conversion layer irradiated with the excitation light beam is r2, and r2 fulfills Formula 3.

$$-d\rho w(r2)/dr = d\rho s(r2)/dr \qquad \text{Formula 3}$$

According to this configuration, the heat of the wavelength conversion layer can efficiently be released.

One aspect of a projector according to the invention includes the light source device described above, a light modulation element adapted to modulate a light beam emitted from the light source device, and a projection optical system adapted to project the light beam modulated by the light modulation element.

According to the aspect of the projector according to the invention, since any one of the light source devices described above is provided, it is possible to inhibit the wavelength conversion layer from rising in temperature to a high temperature level.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a projector according to an embodiment of the invention will be explained with reference to the accompanying drawings.

It should be noted that the scope of the invention is not limited to the embodiment hereinafter described, but can arbitrarily be modified within the technical idea or the technical concept of the invention. Further, in the following drawings, the actual structures and the structures of the drawings are made different from each other in scale size, number, and so on in order to make each constituent easy to understand.

Figure 1:
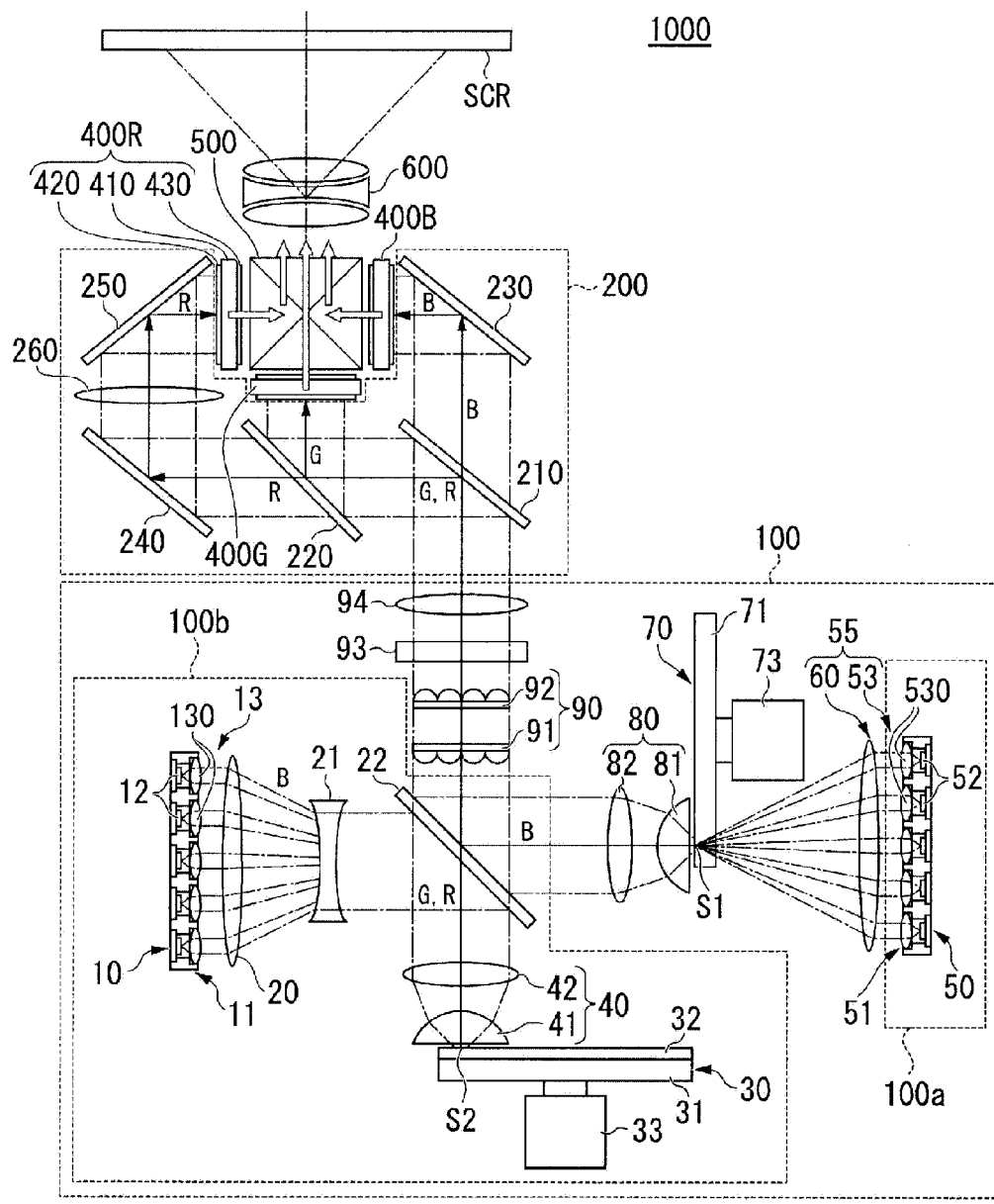
FIG. 1 is a schematic diagram showing a projector according to an embodiment of the invention.

FIG. 1 is a schematic diagram showing the projector 1000 according to the present embodiment.

The projector 1000 according to the present embodiment is provided with a light source device 100, a color separation light guide optical system 200, light modulation devices 400R, 400G, and 400B, a cross dichroic prism 500, and a projection optical system 600. The light modulation devices 400R, 400G, and 400B each correspond to a light modulation element in the appended claims.

The light source device 100 is provided with a first light source device 100a, a first collecting lens 60, a rotating diffusion plate 70 as a diffusion member, a first pickup optical system 80, a second light source device 100b, a fly-eye integrator 90, a polarization conversion element 93, and a second collimator lens 94.

The first light source device 100a is provided with a first light source 50 and a first collimator lens array 53. As described later, the first light source device 100a emits, for example, a laser beam.

The second light source device 100b is provided with a second light source 10, a second collimator lens array 13, a second collecting lens 20, a first collimator lens 21, a dichroic mirror 22, a second pickup optical system 40, an electric motor 33, and a wavelength conversion element 30. The electric motor 33 corresponds to a rotation mechanism in the appended claims. As described later, the second light source device 100b emits, for example, a non-laser beam.

The first light source 50 is a light source array provided with a first platform 51, and a plurality of first solid-state light emitting elements 52 arranged side by side on the first platform 51. The first solid-state light emitting elements 52 are each a light source for emitting a blue light beam which can be reflected by the dichroic mirror 22. Although in the case of the present embodiment, the first solid-state light emitting elements 52 are each, for example, a semiconductor laser for emitting a blue (having the emission intensity peak around 450 nm) laser beam, the first solid-state light emitting elements 52 each can also be an element for emitting the light having a peak wavelength other than 450 nm providing the wavelength of the light is within a range in which the light is reflected by the dichroic mirror 22.

The first collimator lens array 53 is provided with first microlenses 530 corresponding one to one to the first solid-state light emitting elements 52. The plurality of first microlenses 530 is arranged side by side on the first platform 51. Each of the first microlenses 530 is disposed on the light axis of the blue light beam emitted from corresponding one of the first solid-state light emitting elements 52, and collimates and then emits the blue light beam. Thus, a plurality of blue laser beams are emitted from the first light source device 100a.

The plurality of blue light beams emitted from the first collimator lens array 53, namely the plurality of blue laser beams emitted from the first light source device 100a is collected by the first collecting lens 60 formed of a convex lens. The first collimator lens array 53 and the first collecting lens 60 form a first collecting optical system 55 for collecting a plurality of blue light beams emitted from the first light source 50.

The rotating diffusion plate 70 as a diffusion member is a transmissive rotating diffusion plate for diffusing the blue light beams having been input and then emitting the result from a surface on the opposite side. The rotating diffusion plate 70 is provided with a substrate 71 as a diffusion member rotationally driven by the electric motor 73. As the substrate 71, there can be used a known diffusion plate such as frosted glass, a holographic diffuser, a transparent substrate having a surface provided with a blast treatment, or a transparent substrate including diffusion material like beads dispersed inside the transparent substrate to diffuse the light with the diffusion material. Although in the present embodiment, there is used a disk as the substrate 71, the shape of the substrate 71 is not limited to a disk. In the rotating diffusion plate 70, by rotationally driving the substrate 71, a part irradiated with the blue light beams moves relatively to an area S1 irradiated with the blue light beams so as to draw a circle.

The light emitted from the rotating diffusion plate 70 enters the first pickup optical system 80.

The first pickup optical system 80 is disposed on the light path of the light between the dichroic mirror 22 and the rotating diffusion plate 70. The first pickup optical system 80 is configured including a first lens 81 as a pickup lens to which the light from the rotating diffusion plate 70 is input, and a second lens 82 for collimating the light emitted from the first lens 81. The first lens 81 is formed of, for example, a plano-convex lens having a plane of incidence of light having a planar shape, and a light exit surface having a convex curved surface shape. The second lens 82 is formed of, for example, a convex lens. The first pickup optical system 80 roughly collimates the light from the rotating diffusion plate 70, and then makes the result enter the dichroic mirror 22.

It should be noted that the refractive index and the shape of each of the lenses used in the first pickup optical system 80 are determined in accordance with the spread of the blue light beams emitted from the rotating diffusion plate 70. Further, the number of the lenses is not limited to two, and can also be set to one or a plural number no smaller than three.

The dichroic mirror 22 is disposed on the light path of the light having been emitted from the first pickup optical system 80. The surface on the side, to which the light emitted from the first pickup optical system 80 of the dichroic mirror 22 is input, forms an angle of about 45° with respect to the light path direction, and faces to the fly-eye integrator 90. The dichroic mirror 22 folds the blue light beams, which have been input from the first pickup optical system 80, 90° to reflect the blue light beams toward the fly-eye integrator 90.

The second light source 10 is provided with a second platform 11, and a plurality of second solid-state light emitting elements 12 arranged side by side on the second platform 11. The second light source 10 corresponds to a light source in the appended claims.

The second solid-state light emitting elements 12 each emit the excitation light for exciting the wavelength conversion layer provided to the wavelength conversion element 30 described later. Although in the case of the present embodiment, the second solid-state light emitting elements 12 are each, for example, an LED for emitting a blue (having the emission intensity peak around 450 nm) light beam as excitation light, the second solid-state light emitting elements 12 each can also be an element for emitting the light having a peak wavelength other than 450 nm providing the wavelength of the light is within a range in which the light is capable of exciting a wavelength conversion layer 32.

The second collimator lens array 13 is provided with second microlenses 130 corresponding one to one to the second solid-state light emitting elements 12. The plurality of second microlenses 130 is arranged side by side on the second platform 11. Each of the second microlenses 130 is disposed on the light axis of the excitation light beam emitted from corresponding one of the second solid-state light emitting elements 12, and collimates the excitation light beam. The excitation light beams having been emitted from the second collimator lens array 13 are collected by the second collecting lens 20 formed of a convex lens.

On the light path of the excitation light beam between the second collecting lens 20 and the dichroic mirror 22, there is disposed the first collimator lens 21 formed of a biconcave lens. The first collimator lens 21 is disposed between the second collecting lens 20 and the focal position of the second collecting lens 20, and collimates the excitation light input from the second collecting lens 20, and then emits the result to the dichroic mirror 22.

The dichroic mirror 22 is disposed on the light path of the light having been emitted from the collimator lens 21. The surface on the side, to which the light emitted from the first pickup optical system 21 of the dichroic mirror 22 is input, forms an angle of about 45° with respect to the light path direction of the light having been emitted from the first collimator lens 21, and faces to the second pickup optical system 40. The dichroic mirror 22 folds the excitation light beam input from the first collimator lens 21, namely the blue light beam, 90° to reflect the excitation light toward the second pickup optical system 40, and at the same time, transmits the fluorescent light input from the second pickup optical system 40, namely a red light beam and a green light beam.

The second pickup optical system 40 makes the fluorescent light from the wavelength conversion element 30 enter the dichroic mirror 22 in a roughly collimated state. Further, a first lens 41 and a second lens 42 of the second pickup optical system 40 also have a function of converging the excitation light beam input from the dichroic mirror 22, and make the excitation light beam enter the wavelength conversion element 30 in a converged state.

It should be noted that the refractive index and the shape of each of the lenses used in the second pickup optical system 40 are determined in accordance with the spread of the fluorescent light emitted from the wavelength conversion element 30, and the number of the lenses are also not limited to two, and can also beset to one or a plural number no smaller than three.

Figure 2:
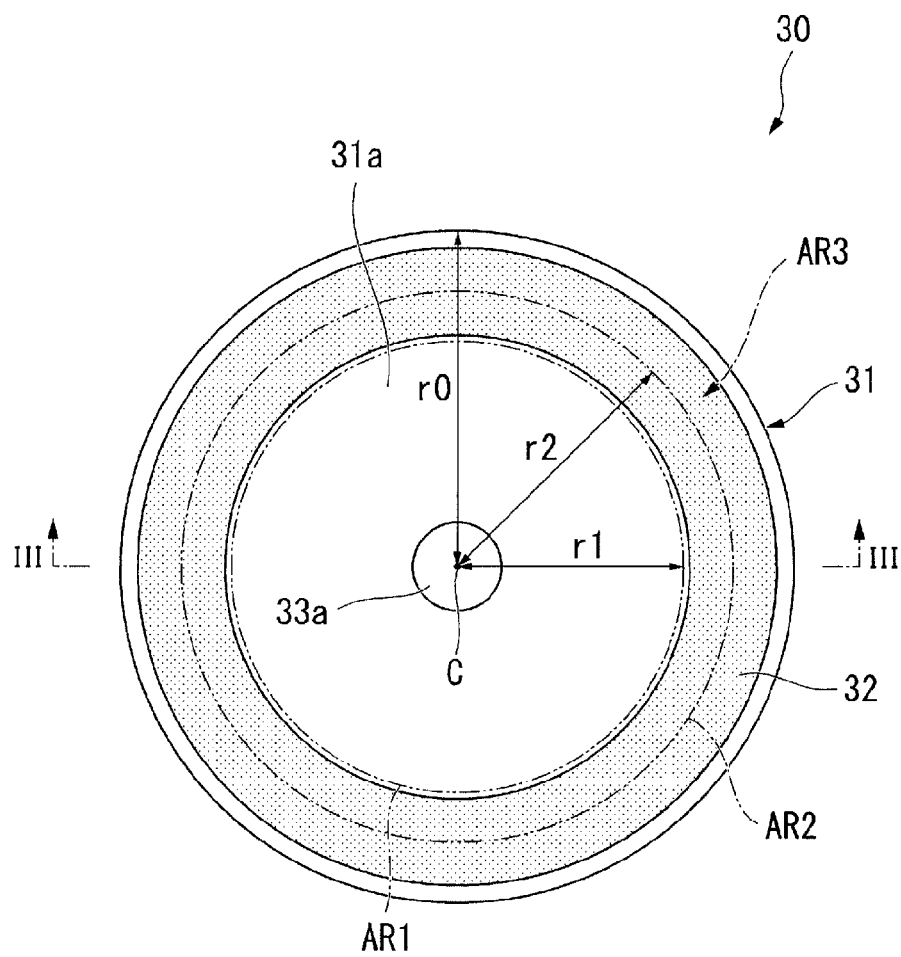
FIG. 2 is a plan view showing a wavelength conversion element and an electric motor of the embodiment.
Figure 3:
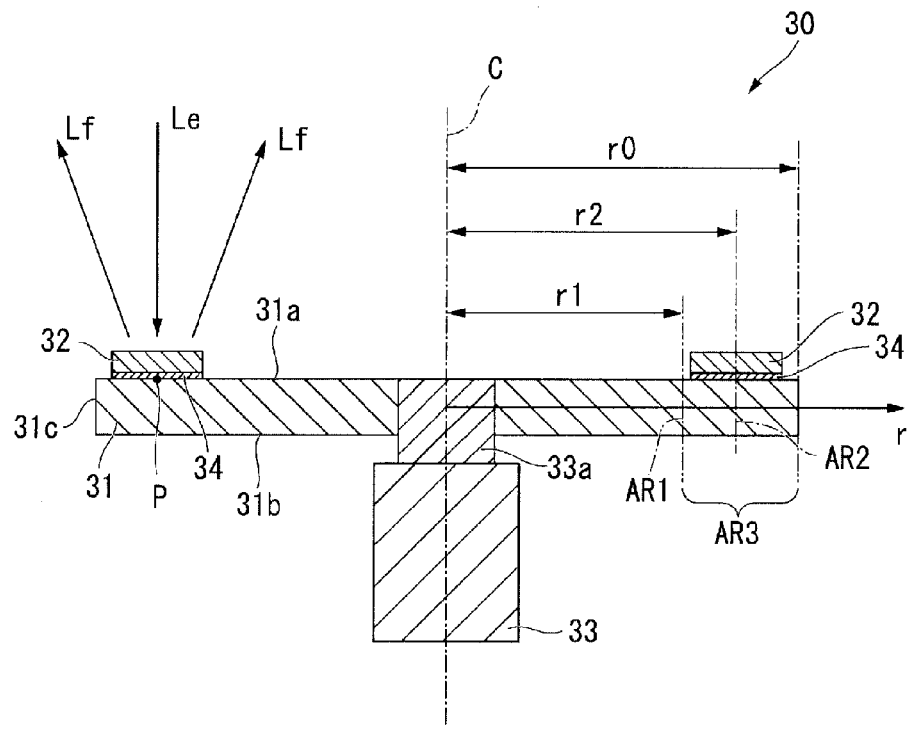
FIG. 3 is a plan view showing the wavelength conversion element and the electric motor of the embodiment, and is a III-III cross-sectional view in FIG. 2.

FIGS. 2 and 3 are diagrams showing the wavelength conversion element 30 and the electric motor 33 of the present embodiment. FIG. 2 is a plan view. FIG. 3 is a III-III cross-sectional view in FIG. 2.

The electric motor 33 is provided with an output shaft 33a as shown in FIGS. 2 and 3. The output shaft 33a is connected concentrically to the disk 31 of the wavelength conversion element 30 described later. The electric motor 33 rotates the wavelength conversion element 30 around the rotational center C.

The wavelength conversion element 30 is a reflective wavelength conversion element for emitting the fluorescent light Lf from the side through which the excitation light Le enters the wavelength conversion element 30. The wavelength conversion element 30 is provided with the disk 31, the wavelength conversion layer 32, and a reflecting layer 34.

It is preferable for the disk 31 to be formed of a metal material high in thermal conductivity such as aluminum, and thus, it is possible to make the disk 31 function as a radiator plate. Above an upper surface 31a of the disk 31 on the second pickup optical system 40 side, there is disposed the wavelength conversion layer 32. It should be noted that the upper surface 31a corresponds to a first surface in the appended claims. In the following explanation, a circular polar coordinate system having the rotational center C as the origin is set on a plane parallel to the upper surface 31a.

The wavelength conversion layer 32 is disposed so as to correspond to the area to which the excitation light beam is input. As shown in FIG. 2, the wavelength conversion layer 32 has a ring-like shape concentric with the disk 31 in a planar view. The wavelength conversion layer 32 is disposed at a position distant inward along the radial direction of the disk 31 from the outer circumference of the disk 31. Regarding the position at which the wavelength conversion layer 32 of the present embodiment is disposed will be described in detail in a latter clause.

The wavelength conversion layer 32 includes, for example, phosphor and a binder for holding the phosphor.

The phosphor of the wavelength conversion layer 32 has phosphor particles each having a particle shape for absorbing the excitation light beams emitted from the second solid-state light emitting elements 12 to emit fluorescent light. The phosphor of the wavelength conversion layer 32 of the present embodiment has a function of, for example, absorbing the excitation light beams (the blue light beams) having a wavelength of about 450 nm to convert the excitation light beams into the fluorescent light in a range of about 490 nm through 750 nm (the emission intensity peak of 570 nm). The fluorescent light includes the green light (with the wavelength of around 530 nm) and the red light (with the wavelength of around 630 nm).

As the generally known yttrium aluminum garnet (YAG) based phosphor can be used as the phosphor particles. As the phosphor particles, for example, the YAG-based fluorescent material having an average particle diameter of 10 μm, and a composition expressed as $(Y, Gd)_3(Al, Ga)_5O_{12}:Ce$ can be used. It should be noted that the constituent material of the phosphor particles can be unique, or it is also possible to use a mixture of the particles formed using two or more constituent materials as the phosphor particles.

The binder of the wavelength conversion layer 32 is formed of an inorganic material such as resin, glass, aluminum oxide, magnesium oxide, silicon carbide, or aluminum nitride.

The reflecting layer 34 is disposed between the disk 31 and the wavelength conversion layer 32. The reflecting layer 34 reflects the fluorescent light generated by the wavelength conversion layer 32.

As shown in FIGS. 1 and 3, the excitation light beams Le (the blue light beams) converged by the first lens 41 and the second lens 42 enter the wavelength conversion element 30 through the surface of the wavelength conversion layer 32 on the opposite side to the reflecting layer 34. The wavelength conversion element 30 emits the fluorescent light beam Lf as the red light beam and the green light beam emitted by the wavelength conversion layer 32 toward the side to which the excitation light beams Le is input. In the wavelength conversion element 30, by rotationally driving the disk 31 using the electric motor 33, apart of the wavelength conversion layer 32 irradiated with the excitation light beams moves relatively to an area S2 irradiated with the excitation light beams so as to draw a circle.

As shown in FIG. 1, the light beam having been emitted from the wavelength conversion element 30 is collimated by the second pickup optical system 40, and then enters the dichroic mirror 22. The dichroic mirror 22 reflects the excitation light beam (the blue light beam) to be removed and transmits the green light beam and the red light beam out of the light input from the second pickup optical system 40. Thus, the green light beam and the red light beam are emitted from the second light source device 100*b*.

Further, the blue light beam having been emitted from the first light source 50 enters the dichroic mirror 22, and is then reflected toward a direction parallel to the light axis of the light having been emitted from the second pickup optical system 40. Thus, the green light beam and the red light beam having been emitted from the second pickup optical system 40 and the blue light beam having been emitted from the first pickup optical system 80 are combined with each other to form a white light beam.

The green light beam, the red light beam, and the blue light beam combined with each other by the dichroic mirror 22 enter the fly-eye integrator 90 formed of a first fly-eye lens array 91 and a second fly-eye lens array 92. The green light beam, the red light, and the blue light having been emitted from the fly-eye integrator 90 are converted by the polarization conversion element 93 into linearly polarized light polarized in one direction, collimated by the second collimator lens 94, and then emitted from the light source device 100. It should be noted that since fly-eye integrator and the polarization conversion element 93 are known technologies disclosed in detail in, for example, JP-A-8-304739, the detailed explanation thereof will be omitted.

The color separation light guide optical system. 200 is provided with dichroic mirrors 210, 220, reflecting mirrors 230, 240, and 250, and a relay lens 260. The color separation light guide optical system 200 has a function of separating the light from the light source device 100 into the red light beam, the green light beam, and the blue light beam, and respectively guiding the red light beam, the green light beam, and the blue light beam to the light modulation devices 400R, 400G, and 400B.

The dichroic mirrors 210, 220 are each a mirror provided with a wavelength selecting transmissive film, which is formed of a dielectric multilayer film reflecting the light beam in a predetermined wavelength band and transmitting the light beam in another wavelength band, and is formed on a substrate. Specifically, the dichroic mirror 210 transmits the blue light beam while reflecting the red light beam and the green light beam. The dichroic mirror 220 reflects the green light beam while transmitting the red light beam.

The reflecting mirrors 230, 240, and 250 are each a mirror for reflecting the incident light beam. Specifically, the reflecting mirror 230 reflects the blue light beam having been transmitted through the dichroic mirror 210. The reflecting mirrors 240, 250 reflect the red light component having been transmitted through the dichroic mirror 220.

The blue light beam having been transmitted through the dichroic mirror 210 is reflected by the reflecting mirror 230, and then enters an image forming area of the light modulation device 400B for the blue light beam. The green light beam having been reflected by the dichroic mirror 210 is further reflected by the dichroic mirror 220, and then enters the image forming area of the light modulation device 400G for the green light beam. The red light beam having been transmitted through the dichroic mirror 220 enters the image forming area of the light modulation device 400R for the red light beam via the reflecting mirror 240 on the entrance side, the relay lens 260, and the reflecting mirror 250 on the exit side.

As the light modulation devices 400R, 400G, and 400B, those generally known can be used, and the light modulation devices 400R, 400G, and 400B are each formed of a light modulation device such as a transmissive liquid crystal light valve having a liquid crystal element 410, and entrance side polarization element 420 and exit side polarization element 430 sandwiching the liquid crystal element 410 therebetween. The entrance side polarization element 420 and the exit side polarization element 430 have, for example, a configuration having the transmission axes perpendicular to each other, namely a cross-Nicol arrangement.

The light modulation devices 400R, 400G, and 400B are for modulating the respective colored light beams having been input thereto in accordance with the image information to thereby form a color image, and constitute the illumination object of the light source device 100. The light modulation of the respective colored light beams having input thereto is performed by the light modulation devices 400R, 400G, and 400B.

For example, the light modulation devices 400R, 400G, and 400B are each a transmissive light modulation device obtained by encapsulating a liquid crystal material between a pair of transparent substrates, and each modulate the polarization direction of a unique linearly polarized light emitted from the entrance side polarization element 420 in accordance with the image information provided thereto using polysilicon TFTs as switching elements.

The cross dichroic prism 500 is an optical element for combining the optical images modulated for respective colored light beams emitted from the respective exit side polarization elements 430 to thereby form a color image. The cross dichroic prism 500 has a roughly square shape in a planar view formed by bonding four rectangular prisms. On the interfaces having a roughly X shape on which the rectangular prisms are bonded to each other, there are formed dielectric multilayer films. The dielectric multilayer film formed on one of the roughly X-shaped interfaces is for reflecting the red light beam, and the dielectric multilayer film formed on the other of the interfaces is for reflecting the blue light beam. The red light beam and the blue light beam are bent by these dielectric multilayer films to have the proceeding directions of the red light beam and the blue light beam be aligned with the proceeding direction of the green light beam, thus the three colored light beams are combined with each other.

The color image emitted from the cross dichroic prism 500 is projected in an enlarged manner by the projection optical system 600 to form an image on a screen SCR.

Then, the thermal resistance of the polarization conversion element 30 will be explained in detail.

The wavelength conversion element 30 of the present embodiment fulfills Formula 1.

$$-d\rho w(r0)/dr < d\rho s(r0)/dr \quad \text{Formula 1}$$

where r represents a moving radius in the circular polar coordinate system, r0 represents a radius of the disk 31, $\rho s(r)$ represents a thermal resistance of a thermal paths passing through the inside and a surface of the disk 31 between the point (e.g., the point P shown in FIG. 3) with the moving radius r on the upper surface 31a of the disk 31 and the entire surface, and $\rho w(r)$ represents a thermal resistance of the wavelength conversion layer 32 in the thickness direction of the wavelength conversion layer 32 at the moving radius r.

Here, the surface of the disk 31 includes the upper surface 31a of the disk 31, a lower surface 31b opposed to the upper surface, and a side surface 31c intersecting with the upper surface 31a and the lower surface 31b.

In the following explanation, $\rho s$ is referred to as the thermal resistance of the disk 31, and $\rho w$ is referred to as the thermal resistance of the wavelength conversion layer 32.

The term $d\rho s(r0)/dr$ is a differential coefficient of the thermal resistance $\rho s$ of the disk 31 with respect to the moving radius r at the moving radius r0, namely at the outer circumference of the disk 31. The term $d\rho w(r0)/dr$ is a differential coefficient of the thermal resistance $\rho w$ of the wavelength conversion layer 32 with respect to the moving radius r at the moving radius r0, namely at the outer circumference of the disk 31.

Figure 4:
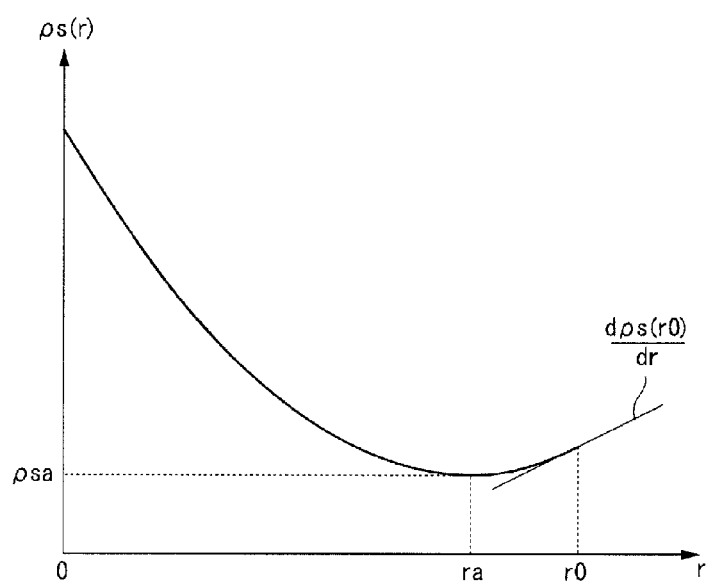
FIG. 4 is a graph showing the thermal resistance of a disk of the embodiment.
Figure 5:
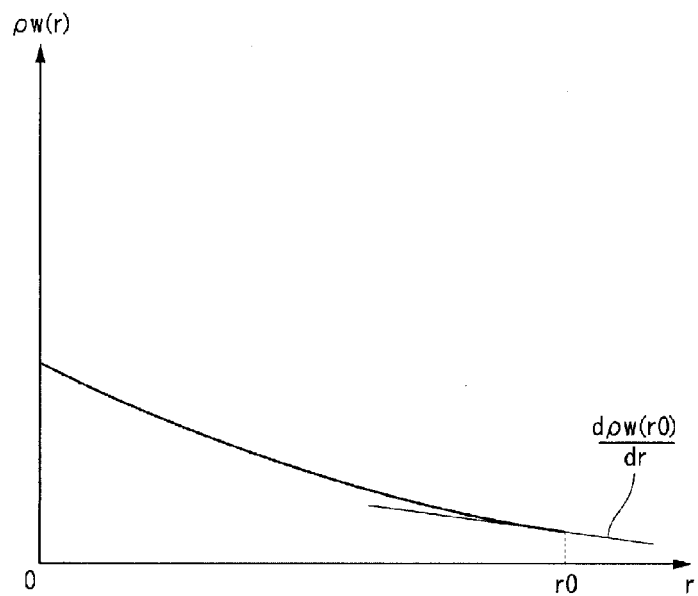
FIG. 5 is a graph showing the thermal resistance of a wavelength conversion layer of the embodiment.
Figure 6:
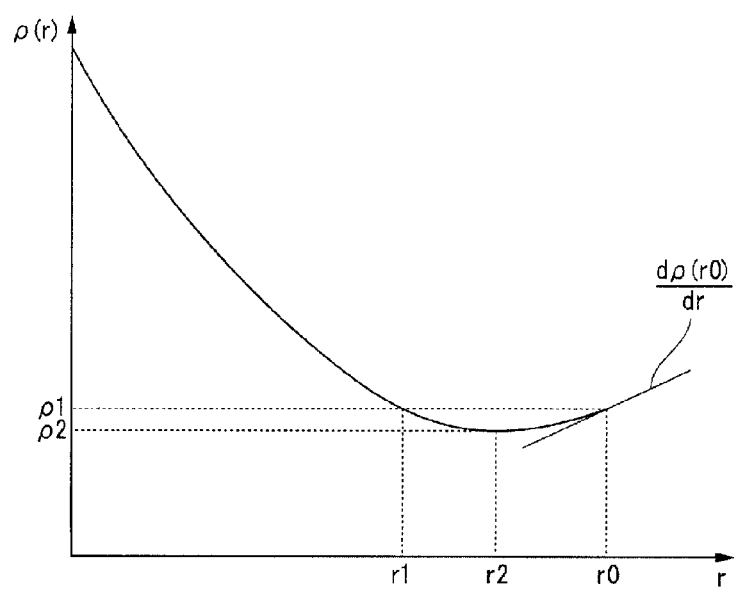
FIG. 6 is a graph showing the thermal resistance of a wavelength conversion element of the embodiment.

FIG. 4 is a graph showing a variation of the thermal resistance $\rho s$ of the disk 31 with respect to the moving radius r. FIG. 5 is a graph showing a variation of the thermal resistance $\rho w$ of the wavelength conversion layer 32 with respect to the moving radius r. FIG. 6 is a graph showing a variation of the thermal resistance $\rho$ of the wavelength conversion element 30 with respect to the moving radius r.

As shown in FIG. 4, the thermal resistance $\rho s$ of the disk 31 takes the minimum value $\rho sa$ at the moving radius ra on the inner side of the outer circumference of the disk 31 in the radius direction.

The thermal resistance $\rho s$ of the disk 31 decreases monotonically in a range of $0 \le r \le ra$, and increases monotonically in a range of $ra < r$. In the example shown in FIG. 4, the curve representing the thermal resistance $\rho s$ of the disk 31 can be approximated by, for example, a quadratic equation. The differential coefficient of the thermal resistance $\rho s$ of the disk 31 at the moving radius r0, namely at the outer circumference of the disk 31 has a positive value.

The fact that the thermal resistance $\rho s$ of the disk 31 varies in a curved manner so as to take the minimum value on the inner side of the outer circumference as shown in FIG. 4 is the knowledge newly obtained by the inventors. The principle that the thermal resistance $\rho s$ of the disk 31 takes the minimum value on the inner side of the outer circumference will be explained using FIG. 7.

Figure 7:
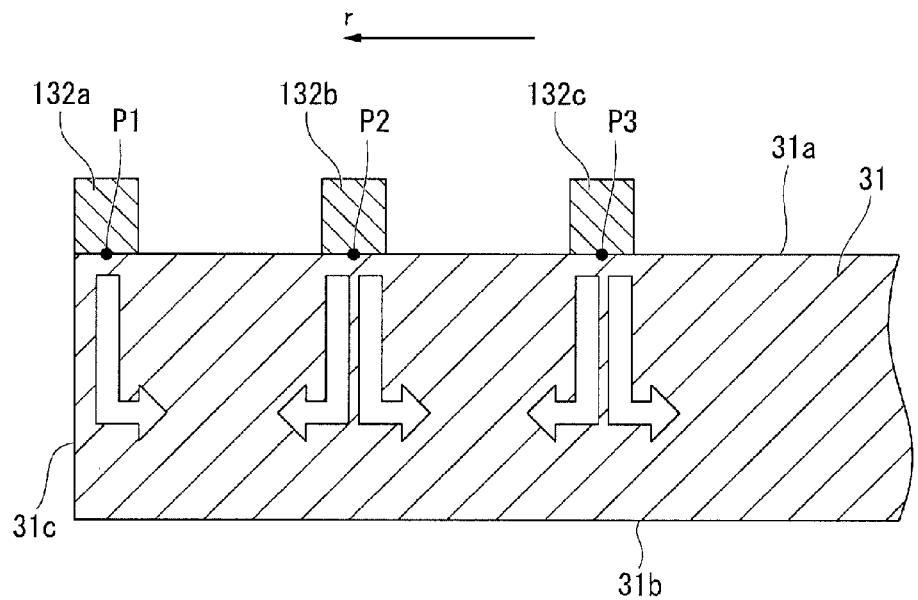
FIG. 7 is an explanatory diagram for explaining a variation of the thermal resistance of the disk.

FIG. 7 is a diagram for explaining the variation of the thermal resistance of the disk 31. In FIG. 7, there is shown the case in which the wavelength conversion layers 132a, 132b, and 132c are disposed at the points P1, P2, and P3, respectively. In FIG. 7, the arrows shown in the inside of the disk 31 schematically indicate the heat radiation from the points P1, P2, and P3. The moving radius r at the points P1, P2, and P3 descends in this order. In other words, the moving radius r at the point P1 is the largest. It is assumed that the point P1 is a point located at roughly the outer circumference of the disk 31. Further, it is assumed that the point P2 corresponds to the point at which the thermal resistance of the disk 31 becomes the minimum in FIG. 4.

The wavelength conversion layer 32 having a ring-like shape is disposed above the disk 31, and the temperature of the disk 31 is the highest immediately below the wavelength conversion layer 32. In the case of considering the diffusion of the heat generated by the wavelength conversion layer 32, it is necessary to consider the heat radiation to the ambient air of the disk 31 and the heat migration in the inside of the disk 31.

The heat radiation performance from the disk 31 to the air is determined by the product of the temperature difference, the area, and the heat-transfer coefficient to the air. Since the heat-transfer coefficient from the disk 31 to the air is constant irrespective of the moving radius r, the heat radiation performance in the case in which the temperature difference exists in the outer circumferential portion larger in heat radiation area is higher than the heat radiation performance in the case in which the temperature difference exists in an inner portion smaller in heat radiation area. In other words, the smaller the moving radius r is, the larger the thermal resistance is.

On the other hand, the heat at the points P2 and P3 located on the inner side of the outer circumference of the disk 31 migrates in the inside of the disk 31 toward the both sides along the moving radius direction as indicated by the arrows. In contrast, the heat at the point P1 migrates only inward along the radial direction of the disk 31 since the point P1 is the point located roughly at the outer circumference of the disk 31. As described above, the number of the heat radiation paths is higher in the inner portion than in the outer circumference portion of the disk 31.

By combining the heat radiation from the disk 31 to the air and the heat migration inside the disk 31 with each other, the following result can be obtained. At the point P1 on the outer circumference of the disk 31, although the heat radiation area on the upper surface 31a is large, the heat radiation path of the disk 31 is just one direction, namely the inward direction, and therefore, the heat radiation is more difficult than that at the point P2, and thus, the thermal resistance increases. Further, since the heat radiation area at the point P3 is smaller than the heat radiation area at the point P2, the thermal resistance at the point P3 is higher than that at the point P2. Therefore, the thermal resistance $\rho s$ of the disk 31 takes the minimum value at the point P2 slightly inside of the outer circumference where the heat radiation area on the upper surface 31a is rather large, and the heat radiation path inside the disk 31 can be assured on the both sides along the moving radius direction.

It should be noted that since the heat conduction in the moving radius direction of the disk 31 is important, the larger the thickness of the disk 31 is, the smaller the thermal resistance $\rho s$ of the disk 31 is. In the present embodiment, the thickness and the thermal conductivity of the disk 31 are constant.

As shown in FIG. 5, the thermal resistance $\rho w$ of the wavelength conversion layer 32 monotonically decreases in a curved manner toward the outer circumference of the disk 31, namely the moving radius r0. This is because the surface area of the wavelength conversion layer 32 at the moving radius r, namely the circumference of the wavelength conversion layer 32 at the moving radius r, increases and thus, the heat radiation area increases toward the outer circumference of the disk 31. Thus, the differential coefficient of the thermal resistance $\rho w$ of the wavelength conversion layer 32 at the moving radius r0, namely at the outer circumference of the disk 31 has a negative value.

It should be noted that since the thickness of the wavelength conversion layer 32 is sufficiently smaller than the size of the area irradiated with the excitation light beam, it can be assumed that the dominant direction of the heat conduction in the wavelength conversion layer 32 is the thickness direction of the wavelength conversion layer 32. Therefore, the larger the thickness of the wavelength conversion layer 32 is, the higher the thermal resistance $\rho w$ of the wavelength conversion layer 32 is, and the higher the thermal conductivity of the wavelength conversion layer 32 is, the lower the thermal resistance $\rho w$ of the wavelength conversion layer 32 is. In the present embodiment, the thickness and the thermal conductivity of the wavelength conversion layer 32 are constant.

The thermal resistance $\rho$ of the wavelength conversion element 30 is given by combining the thermal resistance $\rho s$ of the disk 31, the thermal resistance $\rho w$ of the wavelength conversion layer 32, and the thermal resistance of the air having contact with the surface of the disk 31. It should be noted that since it can be assumed that the thermal resistance of the air is roughly constant irrespective of the moving radius r in the disk 31, in the present specification, it is assumed that the value obtained by combining the thermal resistance $\rho s$ of the disk 31 shown in FIG. 4 and the thermal resistance $\rho w$ of the wavelength conversion layer 32 shown in FIG. 5 with each other is used as the thermal resistance $\rho$ of the wavelength conversion element 30.

The thermal resistance $\rho$ of the wavelength conversion element 30 is either one of a thermal resistance monotonically decreasing as the moving radius r increases and a thermal resistance varying so as to take the minimum value at the inside of the moving radius of r0 similarly to the thermal resistance $\rho s$ of the disk 31.

Here, in the present embodiment, since the wavelength conversion element 30 fulfills Formula 1 described above, the differential coefficient of the thermal resistance $\rho s$ of the disk 31 at the moving radius r0 is larger than the absolute value of the differential coefficient of the thermal resistance $\rho w$ of the wavelength conversion layer 32 at the moving radius r0, namely larger than $-d\rho w(r0)/dr$ in Formula 1. Therefore, the differential coefficient $d\rho(r0)/dr$ of the thermal resistance $\rho$ of the wavelength conversion element 30 at the moving radius r0 takes a positive value as shown in FIG. 6. Further, in the case in which the moving radius is equal to or lower than ra, both of the differential coefficient of the thermal resistance $\rho s$ and the differential coefficient of the thermal resistance $\rho w$ take negative values. Thus, the thermal resistance $\rho$ of the wavelength conversion element 30 of the present embodiment varies so as to take the minimum value at the inside of the moving radius r0.

The condition for the thermal resistance $\rho$ of the wavelength conversion element 30 to take the minimum value at the inside of the moving radius r0, namely Formula 1, is obtained based on the new knowledge that the thermal resistance $\rho s$ of the disk 31 described above varies as shown in FIG. 4.

Then, the position at which the wavelength conversion layer 32 is disposed in the present embodiment will be explained in detail.

As shown in FIG. 3, the wavelength conversion layer 32 is disposed so as to include a range in which the distance from the rotational center C is longer than r1 and shorter than the radius r0 of the disk 31, namely an area included in the area AR3. It should be noted that r1 fulfills Formula 2.

$$\rho s(r1)+\rho w(r1)=\rho s(r0)+\rho w(r0) \quad \text{Formula 2}$$

Formula 2 represents the fact that the thermal resistance $\rho$ of the wavelength conversion element 30 at the moving radius r1 is the same as the thermal resistance $\rho$ of the wavelength conversion element 30 at the moving radius r0. In FIG. 6, both of the thermal resistance $\rho$ of the wavelength conversion element 30 at the moving radius r1 and the thermal resistance $\rho$ of the wavelength conversion element 30 at the moving radius r0 are $\rho 1$. Thus, the area AR3 is an area in which the thermal resistance $\rho$ of the wavelength conversion element 30 is smaller than the value $\rho 1$ of the thermal resistance $\rho$ at the moving radius r0, namely on the outer circumference of the disk 31.

It should be noted that Formula 2 is true only in the wavelength conversion element 30 according to the present embodiment fulfilling Formula 1. This is because in the case in which Formula 1 is not fulfilled, the thermal resistance $\rho$ of the wavelength conversion element monotonically decreases with respect to the moving radius r, and therefore, there is no moving radius r at which the thermal resistance $\rho$ is equal to the thermal resistance $\rho$ at the moving radius r0.

Further, in the present embodiment, the wavelength conversion layer 32 is disposed so as to include the position AR2 having the distance from the rotational center C equal to r2. It should be noted that r2 fulfills Formula 3.

$$-d\rho w(r2)/dr=d\rho s(r2)/dr \quad \text{Formula 3}$$

Formula 3 represents the fact that the moving radius r2 is the moving radius at which the sum of the differential coefficient of the thermal resistance $\rho s$ of the disk 31 and the differential coefficient of the thermal resistance $\rho w$ of the wavelength conversion layer 32 is equal to zero. In other words, the moving radius r2 is the moving radius at which the differential coefficient of the thermal resistance $\rho$ of the wavelength conversion element 30 is zero. Therefore, in the wavelength conversion element 30 according to the present embodiment fulfilling Formula 1, the moving radius r2 is the moving radius at which the thermal resistance ρ of the wavelength conversion element 30 takes the minimum value ρ2.

In the present embodiment, the wavelength conversion layer 32 is disposed so as to be located outside in the radial direction of the disk 31 from the position AR1 at which the distance in the radial direction from the rotational center C is equal to r1, and inside the outer circumference of the disk 31. In other words, the wavelength conversion layer 32 is disposed only in the area AR3. Further, in the present embodiment it is designed that, for example, the wavelength conversion layer 32 is irradiated with excitation light beam Le so that the center of the excitation light beam Le corresponds to the position with the moving radius r2. In other words, in the present embodiment, the central moving radius in the moving radius direction of the area of the wavelength conversion layer 32 irradiated with the excitation light Le is r2.

According to the present embodiment, by fulfilling Formula 1 described above, the thermal resistance ρ of the wavelength conversion element 30 takes the minimum value at a position inside of the outer circumference of the disk 31. Therefore, it is easy to irradiate the place, at which the thermal resistance ρ takes the minimum value, with the excitation light beam Le, and as a result, the heat of the wavelength conversion layer 32 can efficiently be released. Thus, the wavelength conversion layer 32 can be inhibited from rising in temperature to a high temperature level. Therefore, according to the present embodiment, the degradation of the conversion efficiency of the wavelength conversion layer 32 and the breakage of the wavelength conversion layer 32 can be inhibited, and the wavelength conversion element, the light source device, and the projector all superior in reliability can be obtained.

Further, since the wavelength conversion element in the related art fails to fulfill Formula 1 described above, the thermal resistance of the wavelength conversion element monotonically decreases toward the outer circumference of the disk. Thus, the thermal resistance of the wavelength conversion element becomes the smallest at the outer circumference of the disk. Therefore, it is also possible to efficiently release the heat in the wavelength conversion element in the related art by designing the configuration so that the outer circumference of the disk is irradiated with the excitation light beam. However, if such a configuration is adopted, a part of the excitation light beam runs off the disk to deteriorate the light efficiency.

In contrast, according to the present embodiment, since the thermal resistance ρ of the wavelength conversion element 30 takes the minimum value at a position inside of the outer circumference of the disk 31, the heat of the wavelength conversion layer 32 can efficiently be released while inhibiting the excitation light Le from running off the disk 31 to deteriorate the light efficiency.

Further, according to the present embodiment, the wavelength conversion layer 32 is disposed so as to include the area included in the area AR3 in which the distance from the rotational center C is longer than r1 fulfilling Formula 2 and shorter than the radius r0 of the disk 31. Since the thermal resistance ρ of the wavelength conversion element 30 in the area AR3 is smaller than the thermal resistance ρ of the wavelength conversion element 30 at the outer circumference of the disk 31, the heat of the wavelength conversion layer 32 can efficiently be released, by irradiating the area of the wavelength conversion layer 32 included in the area AR3 with the excitation light beam Le, to inhibit the wavelength conversion layer 32 from rising in temperature to a high temperature level.

Further, according to the present embodiment, since the wavelength conversion layer 32 is disposed only in the area AR3, even in the case of irradiating anyplace in the wavelength conversion layer 32 with the excitation light beam Le, the thermal resistance ρ of the wavelength conversion element 30 at the place irradiated with the excitation light beam Le is smaller than the thermal resistance ρ at the outer circumference, and thus the heat of the wavelength conversion layer 32 can efficiently be released.

Further, according to the present embodiment, the wavelength conversion layer 32 is disposed so as to include the position AR2 at which the moving radius is r2 fulfilling Formula 3. In other words, the wavelength conversion layer 32 is disposed at the position at which the thermal resistance ρ of the wavelength conversion element 30 takes the minimum value. Therefore, by setting the moving radius of the center of the area of the wavelength conversion layer 32 in the moving radius direction irradiated with the excitation light beam Le to r2, the area with the highest heat generation amount can be disposed at the position at which the thermal resistance ρ of the wavelength conversion element 30 takes the minimum value. Thus, the heat of the wavelength conversion layer 32 can more efficiently be released to thereby further inhibit the wavelength conversion layer 32 from rising in temperature to a high temperature level.

It should be noted that in the present embodiment, it is also possible to adopt the following configurations.

Although in the explanation described above, there is adopted the configuration in which the wavelength conversion layer 32 is disposed only in the area AR3, the invention is not limited to this configuration. In the present embodiment, the wavelength conversion layer 32 can also be disposed so as straddle an area inside in the radial direction from the position AR1 and the area AR3, or can also disposed in the entire area of the upper surface 31a of the disk 31.

Further, in the present embodiment, it is also possible for the area of the wavelength conversion layer 32 irradiated with the excitation light beam Le to have the moving radius larger than r1 and smaller than r0. According to this configuration, since the heat generation area is located at the area where the thermal resistance ρ is smaller than the thermal resistance ρ at the outer circumference of the disk 31, the heat of the wavelength conversion layer 32 can efficiently be released.

In the present embodiment, it is also possible to adopt a configuration in which the wavelength conversion layer 32 is formed only of the phosphor.

In the present embodiment, the reflecting layer 34 can also be disposed in the entire area of the upper surface 31a of the disk 31.

Further, in the present embodiment, it is also possible to adopt a configuration in which the disk 31 is formed of a material reflecting the fluorescent light Lf emitted by the wavelength conversion layer 32, and functions as a reflecting layer.

Specific Example

In the present specific example, the variation of the thermal resistance ρ of the wavelength conversion element with respect to the moving radius r was obtained by a simulation.

The thermal resistance ρs of the disk can be obtained from the temperature distribution of the disk. Assuming that the heat generation amount of the heat generation region is Ww, the average temperature of the disk is Tave, and the temperature of the heat generation region is Tmax, the thermal resistance ρs of the disk can be provided by Formula 4.

$$\rho s = (T\max - T ave)/Ww \quad \text{Formula 4}$$

In the simulation, the radius r0 of the disk, the thickness Ts of the disk, the thermal conductivity λs of the disk, the heat-transfer coefficient h from the disk to the air, the heat generation amount Ww of the heat generation region, and the moving radius r of the heat generation region were used as parameters. Specifically, r0=60 (mm), Ts=1 (mm), h=72 (w/(m²K)), and Ww=1 (W) were used. Further, a ring centered on the rotational center of the disk and having a radius r was used as the heat generation region. By obtaining the temperature distribution of the disk with respect to a variety of values of the moving radius r, the thermal resistance ρs of the disk can be obtained as a function of the moving radius r. In such a manner, the thermal resistance ρs of the disk was obtained as the function of the moving radius r in each of the cases in which the thermal conductivity λs is 10 W/mK, 50 W/mK, and 147 W/mK, respectively.

The thermal resistance ρw of the wavelength conversion layer is given by Formula 5 assuming that the thickness of the wavelength conversion layer is Tp, the thermal conductivity of the wavelength conversion layer is λw, and the width of the heat generation region having a ring-like shape is Wp.

$$\rho w = Tp/(2\pi r \times Wp \times \lambda w) \quad \text{Formula 5}$$

The configuration including the phosphor and the binder was adopted as the wavelength conversion layer, and the thermal resistance ρw of the wavelength conversion layer was obtained in each of the cases in which the thermal conductivity λw of the wavelength conversion layer is 0.2 W/mK and 1 W/mK, respectively. It should be noted that Tp=0.1 (mm), and Wp=1 (mm) were used. The case in which the thermal conductivity λw is 0.2 W/mK corresponds to the case of using resin as the binder, and the case in which the thermal conductivity λw is 1 W/mK corresponds to the case of using glass as the binder.

Figure 8:
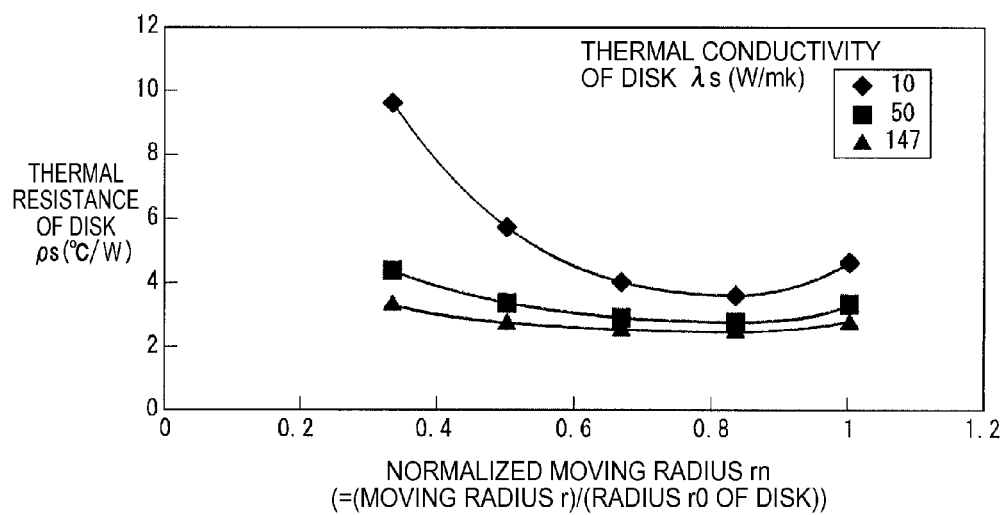
FIG. 8 is a graph showing the thermal resistance of a disk of a specific example.

FIG. 8 is a graph showing the thermal resistance ρs of the disk. In FIG. 8, the vertical axis represents the thermal resistance ρs [° C./W] of the disk, and the horizontal axis represents the moving radius rn normalized by the radius r0 of the disk, namely (moving radius r)/(radius r0 of disk).

As shown in FIG. 8, it was confirmed that the thermal resistance ρs of the disk took the minimum value at a position inside of the outer circumference, namely within a range where the normalized moving radius rn was smaller than 1, in either of the cases of the thermal conductivity λs of the disk.

Figure 9:
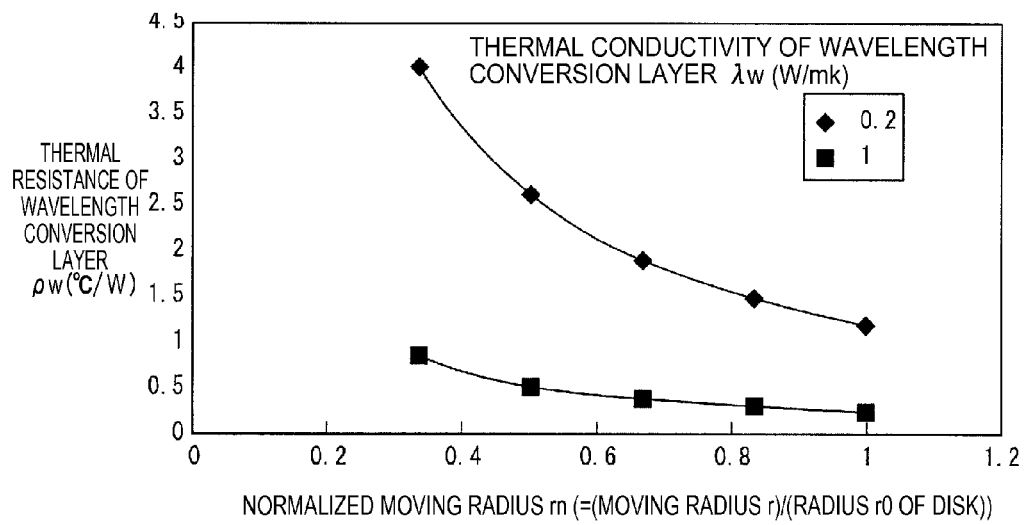
FIG. 9 is a graph showing the thermal resistance of a wavelength conversion layer of the specific example.

FIG. 9 is a graph showing the thermal resistance ρw of the wavelength conversion layer. In FIG. 9, the vertical axis represents the thermal resistance ρw [° C./W] of the wavelength conversion layer, and the horizontal axis represents the normalized moving radius rn.

As shown in FIG. 9, it was confirmed that in either of the cases of the thermal conductivity λw of the wavelength conversion layer, the thermal resistance ρw of the wavelength conversion layer monotonically decreased toward the outer circumference of the disk.

Subsequently, the combinations fulfilling Formula 1 were selected from the values of the thermal resistance ρs of the disk and the thermal resistance ρw of the wavelength conversion layer thus obtained, and the thermal resistance ρs and the thermal resistance ρw were summed up in each of the combinations to obtain the thermal resistance ρ of the wavelength conversion element. The results obtained are shown in FIG. 10.

Figure 10:
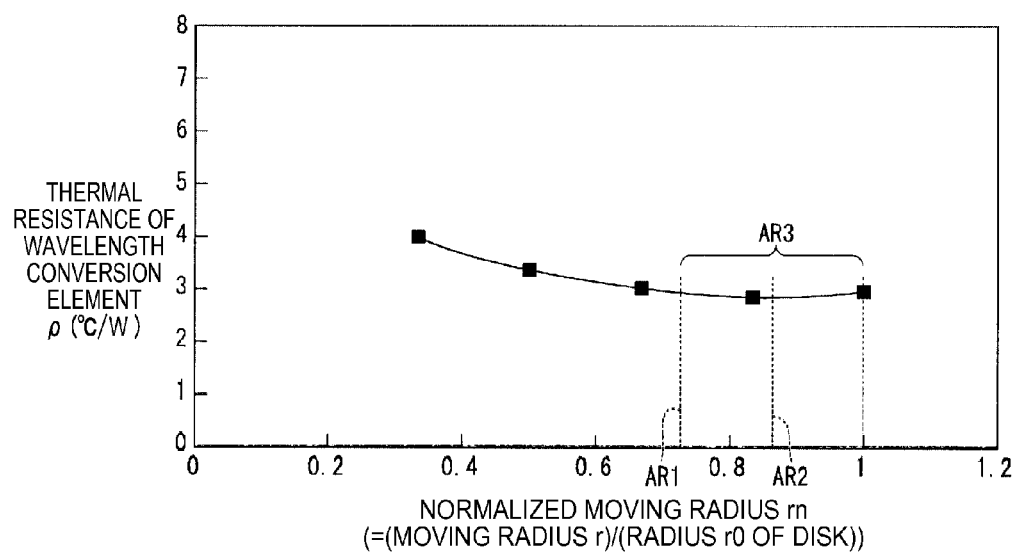
FIG. 10 is a graph showing the thermal resistance of a wavelength conversion element of the specific example.

FIG. 10 is a graph showing the thermal resistance ρ of the wavelength conversion element. In FIG. 10, the vertical axis represents the thermal resistance ρ [° C./W] of the wavelength conversion element, and the horizontal axis represents the normalized moving radius rn. In FIG. 10, as an example of the combination satisfying Formula 1, there is shown the thermal resistance ρ of the wavelength conversion element in the case of setting the thermal conductivity λs of the disk to 147 W/mK and the thermal conductivity λw of the wavelength conversion layer to 1 W/mK. In this case, the material of the disk is an aluminum alloy, and the material of the binder of the wavelength conversion layer is glass.

Here, in FIG. 8, in the case of setting the thermal conductivity λs to 147 W/mK, the differential coefficient of the thermal resistance ρs at the moving radius rn=1 was 1.19. In FIG. 9, in the case of setting the thermal conductivity λw to 1 W/mK, the differential coefficient of the thermal resistance ρw at the moving radius rn=1 was −0.27. Therefore, in the case of setting the thermal conductivity λs of the disk to 147 W/mK, and the thermal conductivity λw of the wavelength conversion layer to 1 W/mK, the wavelength conversion element satisfies Formula 1.

As shown in FIG. 10, it was confirmed that the position AR2 at which the thermal resistance ρ of the wavelength conversion element took the minimum value existed at the position inside of the outer circumference, namely at the position where the moving radius rn was smaller than 1. Specifically, it was confirmed that the thermal resistance ρ took the minimum value at the position where the moving radius rn took a value of 0.85.

Further, it was found out that the moving radius rn of the position AR1, at which the thermal resistance ρ of the wavelength conversion element took the same value as the value of the thermal resistance ρ at the outer circumference of the disk, was 0.72. Therefore, the area AR3 is a range fulfilling the condition of 0.72<rn<1.

According to the above, it was confirmed that by fulfilling Formula 1, the thermal resistance ρ of the wavelength conversion element took the minimum value at the position inside of the outer circumference.

It should be noted that although in the specific example described above, the thermal resistance ρ of the wavelength conversion element is described only in the case of using the aluminum alloy as the material of the disk, and glass as the material of the binder of the wavelength conversion layer, the materials of the disk and the wavelength conversion layer are not limited to those in this case. Even in the case of using any material as the materials of the disk and the wavelength conversion layer within the range of fulfilling FIG. 1, it is possible to realize the configuration in which the thermal resistance ρ of the wavelength conversion element takes the minimum value at a position inside of the outer circumference. For example, as the material of the disk, there can be adopted copper, silver, and so on, and as the material of the binder of the wavelength conversion layer, there can be adopted resin, aluminum oxide, magnesium oxide, silicon carbide, aluminum nitride, and so on. Further, as the wavelength conversion layer, a sintered object without using the binder, a polycrystalline body, a single crystal body, and so on can also be used.

The entire disclosure of Japanese Patent Application No. 2014-130549, filed on Jun. 25, 2014 is expressly incorporated by reference herein.

What is claimed is:

1. A wavelength conversion element comprising:
    a disk having a first surface, and rotatable around a rotational center;
    a wavelength conversion layer disposed above the first surface of the disk, and having a predetermined thickness; and
    a reflecting layer disposed between the disk and the wavelength conversion layer, and adapted to reflect a light beam generated by the wavelength conversion layer,
    wherein Formula 1 is fulfilled:

$$-d\rho w(r0)/dr < d\rho s(r0)/dr \qquad \text{Formula 1}$$

where
    assuming that a circular polar coordinate system having the rotational center as an origin is set on a plane parallel to the first surface of the disk,
    r: moving radius in the circular polar coordinate system,
    r0: radius of the disk,
    $\rho s(r)$: thermal resistance of thermal paths passing through inside and a surface of the disk between a point with the moving radius r on the first surface of the disk and an entire surface of the disk, and
    $\rho w(r)$: thermal resistance of the wavelength conversion layer in a thickness direction of the wavelength conversion layer at the moving radius r.

2. The wavelength conversion element according to claim 1, wherein
    the wavelength conversion layer is disposed so as to include an area included in a range in which the moving radius is larger than r1 and smaller than r0, and
    r1 fulfills Formula 2:

$$\rho s(r1)+\rho w(r1)=\rho s(r0)+\rho w(r0). \qquad \text{Formula 2}$$

3. The wavelength conversion element according to claim 2, wherein
    the wavelength conversion layer is disposed only in a range in which the moving radius is larger than r1 and smaller than r0.

4. The wavelength conversion element according to claim 2, wherein
    the wavelength conversion layer is disposed so as to include a position at which the moving radius is r2, and
    r2 fulfills Formula 3:

$$-d\rho w(r2)/dr = d\rho s(r2)/dr. \qquad \text{Formula 3}$$

5. A light source device comprising:
    the wavelength conversion element according to claim 1;
    a light source adapted to emit an excitation light beam; and
    a rotation mechanism adapted to rotate the disk centered on the rotational center,
    wherein the excitation light beam enters the wavelength conversion layer from an opposite side to the reflecting layer.

6. The light source device according to claim 5, wherein
    the wavelength conversion layer is disposed so as to include an area included in a range in which the moving radius is larger than r1 and smaller than r0,
    an area of the wavelength conversion layer irradiated with the excitation light beam includes the area included in a range in which the moving radius is larger than r1 and smaller than r0, and
    r1 fulfills Formula 2:

$$\rho s(r1)+\rho w(r1)=\rho s(r0)+\rho w(r0). \qquad \text{Formula 2}$$

7. The light source device according to claim 6, wherein
    the wavelength conversion layer is disposed so as to include a position at which the moving radius is r2,
    the moving radius of a center in the moving radius direction of an area of the wavelength conversion layer irradiated with the excitation light beam is r2, and
    r2 fulfills Formula 3:

$$-d\rho w(r2)/dr = d\rho s(r2)/dr. \qquad \text{Formula 3}$$

8. A projector comprising:
    the light source device according to claim 7;
    a light modulation element adapted to modulate a light beam emitted from the light source device; and
    a projection optical system adapted to project the light beam modulated by the light modulation element.

9. A projector comprising:
    the light source device according to claim 5;
    a light modulation element adapted to modulate a light beam emitted from the light source device; and
    a projection optical system adapted to project the light beam modulated by the light modulation element.

10. A projector comprising:
    the light source device according to claim 6;
    a light modulation element adapted to modulate a light beam emitted from the light source device; and
    a projection optical system adapted to project the light beam modulated by the light modulation element.

* * * * *